United States Patent
Aly et al.

(10) Patent No.: US 12,489,691 B2
(45) Date of Patent: Dec. 2, 2025

(54) METHOD FOR PERSISTING SERVICE DISCOVERY LEARNING

(71) Applicant: GM GLOBAL TECHNOLOGY OPERATIONS LLC, Detroit, MI (US)

(72) Inventors: Sherif Aly, West Bloomfield, MI (US); David M Frazier, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 232 days.

(21) Appl. No.: 18/334,684

(22) Filed: Jun. 14, 2023

(65) Prior Publication Data

US 2024/0422080 A1 Dec. 19, 2024

(51) Int. Cl.
| | |
|---|---|
| *H04L 12/12* | (2006.01) |
| *G06F 8/71* | (2018.01) |
| *H04L 12/40* | (2006.01) |
| *H04L 41/50* | (2022.01) |
| *H04L 67/12* | (2022.01) |
| *H04L 67/51* | (2022.01) |
| *G06F 8/65* | (2018.01) |

(52) U.S. Cl.
CPC .......... *H04L 41/5058* (2013.01); *H04L 67/12* (2013.01); *G06F 8/65* (2013.01)

(58) Field of Classification Search
CPC ............... H04L 41/5058; H04L 67/12; H04L 2012/40273; H04L 12/12; H04L 67/51; H04L 12/40; G06F 8/65; G06F 9/30003; G06F 8/71; G06F 9/44505; G05B 19/0421
See application file for complete search history.

(56) References Cited

U.S. PATENT DOCUMENTS

| | | | |
|---|---|---|---|
| 8,718,797 B1 * | 5/2014 | Addepalli | H04W 8/06 700/83 |
| 2015/0117430 A1 * | 4/2015 | Zhuang | H04L 67/51 370/338 |
| 2017/0010588 A1 | 1/2017 | Porembski et al. | |
| 2017/0019487 A1 * | 1/2017 | Maheshwari | H04L 67/51 |

(Continued)

FOREIGN PATENT DOCUMENTS

| | | |
|---|---|---|
| DE | 102021123326 A1 | 3/2023 |
| KR | 1020230045932 A | 4/2023 |

*Primary Examiner* — Kito R Robinson
*Assistant Examiner* — Anthony Gabriel Mora
(74) *Attorney, Agent, or Firm* — Ingrassia Fisher & Lorenz, LLP | IF&L

(57) ABSTRACT

Methods and systems are provided that include a transceiver and one or more processors. The transceiver is configured to at least facilitate receiving an indication of a trigger for service discovery learning for a plurality of control modules for a vehicle. The one or more processors are coupled to the transceiver, and are configured to at least facilitate performing service discovery learning among the plurality of control modules as to services to be offered or required by each of the control modules, storing information as to the services in a non-volatile memory, and after the indication of the trigger and before the services are actually required; and subsequently, when an event occurs in which the services are actually required, requesting and offering the services via the plurality of control modules based on the service discovery learning.

20 Claims, 6 Drawing Sheets

(56) References Cited

U.S. PATENT DOCUMENTS

| | | | |
|---|---|---|---|
| 2019/0082381 A1* | 3/2019 | Thanayankizil | H04W 4/02 |
| 2019/0126859 A1 | 5/2019 | Parmar et al. | |
| 2020/0178048 A1* | 6/2020 | Kim | H04W 12/062 |
| 2020/0351158 A1* | 11/2020 | Krivenok | H04L 49/70 |
| 2020/0412811 A1* | 12/2020 | Campbell | H04L 65/752 |
| 2021/0399916 A1* | 12/2021 | Rox | H04L 63/04 |
| 2022/0086607 A1* | 3/2022 | Ali | H04W 4/80 |
| 2022/0116445 A1* | 4/2022 | Filippou | H04L 41/0853 |
| 2022/0167262 A1* | 5/2022 | Ding | H04L 67/56 |
| 2022/0394103 A1* | 12/2022 | Henschel | H04L 67/141 |
| 2023/0199868 A1* | 6/2023 | Kedalagudde | H04L 67/141 370/328 |
| 2024/0121598 A1* | 4/2024 | Boccuzzi | H04L 41/5058 |

\* cited by examiner

500 ⤴

| Learning Table @ Client Section(192.168.32.13) ||
|---|---|
| Service ID (2 bytes) | Service IP Address (4bytes) |
| 0x1234 | 192.168.32.10 |
| 0xABCD | 192.168.32.10 |

504 → Service ID column; 506 → Service IP Address column; 508 → 0x1234 row; 510 → 0xABCD row; 512, 514 → IP address entries

| Learning Table @ Server Section(192.168.32.10) ||
|---|---|
| Service ID + Event ID (4 bytes) | Client IP Address (4bytes) |
| 0x12340012 | 192.168.32.13 |
| 0xABCD0014 | 192.168.32.13 |

554 → Service ID + Event ID column; 556 → Client IP Address column; 558 → 0x12340012 row; 560 → 0xABCD0014 row; 562, 564 → IP address entries

FIG. 5B

METHOD FOR PERSISTING SERVICE DISCOVERY LEARNING

TECHNICAL FIELD

The technical field generally relates to vehicles, and particularly to service discovery for control modules of vehicles.

BACKGROUND

Many vehicles today have different control modules that request services from and provide services to one another. However, existing systems and methods may not be optimal under certain situations, for example as relationships between control modules and their respective services may not be established at an optimal time.

Accordingly, it is desirable to provide improved methods and systems for service discovery of control modules of vehicles. Furthermore, other desirable features and characteristics of the present invention will become apparent from the subsequent detailed description of the invention and the appended claims, taken in conjunction with the accompanying drawings and this background of the invention.

SUMMARY

In an exemplary embodiment, a method is provided that includes receiving an indication of a trigger for service discovery learning for a plurality of control modules for a vehicle: performing service discovery learning among the plurality of control modules via a communications network as to services to be offered or required by each of the control modules, after the indication of the trigger and before the services are actually required, in accordance with instructions provided by one or more processors of the plurality of control modules; and subsequently, when an event occurs in which the services are actually required, requesting and offering the services via the plurality of control modules based on the service discovery learning.

Also in an exemplary embodiment, the method further includes controlling one or more vehicle actions, in accordance with control instructions provided by the one or more processors, using one or more engine parameters or other vehicle parameters via the services in response to the event.

Also in an exemplary embodiment, the trigger for the service discovery includes a software update for the plurality of control modules.

Also in an exemplary embodiment, the plurality of control modules are in a dormant mode after the service discovery learning and prior to the event in which the services are actually required, and only certain control modules of the plurality of control modules that are needed for the services are woken from the dormant mode following the event.

Also in an exemplary embodiment, the service discovery learning includes, for each particular control module, identifying a list of services to be offered or required by the particular control module along with IP addresses of other control modules that subscribe to or provide the services.

Also in an exemplary embodiment, a timer is utilized for the service discovery learning in determining when the service discovery learning, and the service discovery learning is restarted when the service discovery learning is not yet completed upon expiration of the timer.

Also in an exemplary embodiment, the method further includes storing, into a non-volatile memory of the particular control module, a learning table that includes the list of services to be offered or required by the particular control module along with the IP addresses of the other control modules that subscribe to or provide the services.

Also in an exemplary embodiment, the method further includes: subsequently, when the event occurs in which the services are actually required, requesting and offering the services via the plurality of control modules based on the learning table stored in the non-volatile memory of the particular control module.

In another exemplary embodiment, a system is provided that includes a transceiver and one or more processors. The transceiver is configured to at least facilitate receiving an indication of a trigger for service discovery learning for a plurality of control modules for a vehicle. The one or more processors are coupled to the transceiver, and are configured to at least facilitate performing service discovery learning among the plurality of control modules as to services to be offered or required by each of the control modules, after the indication of the trigger and before the services are actually required; and subsequently, when an event occurs in which the services are actually required, requesting and offering the services via the plurality of control modules based on the service discovery learning.

Also in an exemplary embodiment, the one or more processors are further configured to at least facilitate controlling one or more vehicle actions, in accordance with instructions provided by the one or more processors, using one or more engine parameters or other vehicle parameters via the services in response to the event.

Also in an exemplary embodiment, the trigger for the service discovery includes a software update for the plurality of control modules.

Also in an exemplary embodiment, the plurality of control modules are in a dormant mode after the service discovery learning and prior to the event in which the services are actually required, and only certain control modules of the plurality of control modules that are needed for the services are woken from the dormant mode following the event.

Also in an exemplary embodiment, the service discovery learning includes, for each particular control module, identifying a list of services to be offered or required by the particular control module along with IP addresses of other control modules that subscribe to or provide the services.

Also in an exemplary embodiment, a timer is utilized for the service discovery learning in determining when the service discovery learning, and the service discovery learning is restarted when the service discovery learning is not yet completed upon expiration of the timer.

Also in an exemplary embodiment, the one or more processors are further configured to at least facilitate storing, into a non-volatile memory of the particular control module, a learning table that includes the list of services to be offered or required by the particular control module along with the IP addresses of the other control modules that subscribe to or provide the services.

Also in an exemplary embodiment, the one or more processors are further configured to at least facilitate: subsequently, when the event occurs in which the services are actually required, requesting and offering the services via the plurality of control modules based on information retrieved by a processor of the particular control module from the learning table stored in the non-volatile memory of the particular control module.

In another exemplary embodiment, a vehicle is provided that includes a body, a drive system, a transceiver, and one or more processors. The drive system is configured to move the body. The transceiver is disposed on or more within the body, and is configured to at least facilitate receiving an indication of a trigger for service discovery learning for a plurality of control modules for the vehicle. The one or more processors are disposed on or within the body, are coupled to the transceiver, and are configured to at least facilitate performing service discovery learning among the plurality of control modules as to services to be offered or required by each of the control modules, after the indication of the trigger and before the services are actually required; and subsequently, when an event occurs in which the services are actually required, requesting and offering the services via the plurality of control modules based on the service discovery learning.

Also in an exemplary embodiment, the plurality of control modules are in a dormant mode after the service discovery learning and prior to the event in which the services are actually required, and only certain control modules of the plurality of control modules that are needed for the services are woken from the dormant mode following the event.

Also in an exemplary embodiment, the vehicle further includes a non-volatile memory configured to store a learning table that includes a list of services to be offered or required by a particular control module along with IP addresses of other control modules that subscribe to or provide the services: wherein the one or more processors are further configured to at least facilitate storing the learning table into the non-volatile memory.

Also in an exemplary embodiment, the one or more processors are further configured to at least facilitate: subsequently, when the event occurs in which the services are actually required, requesting and offering the services via the plurality of control modules based on information retrieved by a processor of the particular control module from the learning table stored in the non-volatile memory of the particular control module.

DESCRIPTION OF THE DRAWINGS

The present disclosure will hereinafter be described in conjunction with the following drawing figures, wherein like numerals denote like elements, and wherein:

FIGS. 4, 5A, 5B, and 6 illustrate exemplary illustrations of the process of FIG. 3, in accordance with an exemplary embodiment.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
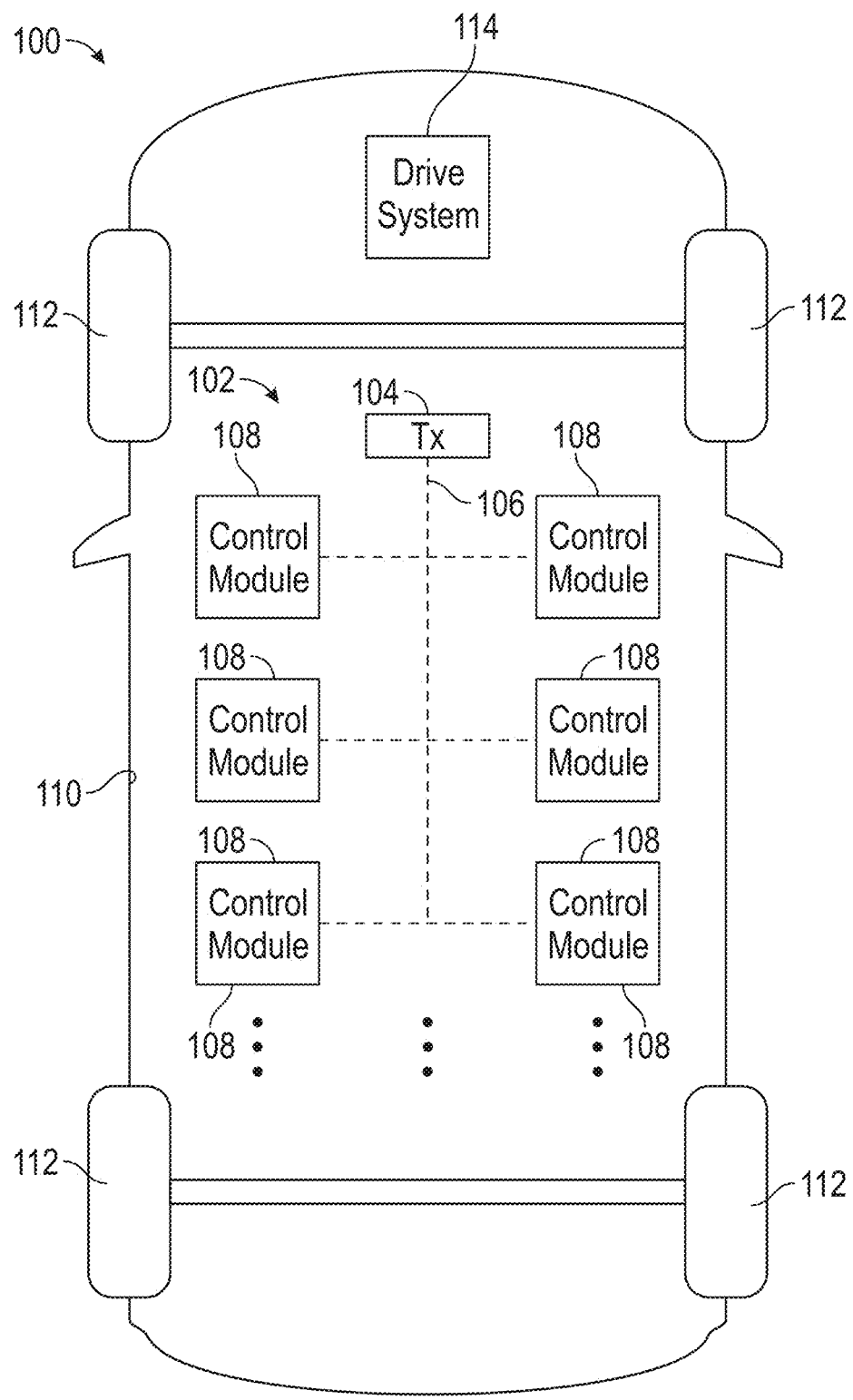
FIG. 1 is a functional block diagram of a vehicle that includes a plurality of control modules that request services from and provide services to one another, and for which service discovery is controlled with relationships that are pre-established prior to when a trigger event has occurred that actually requires the services, in accordance with an exemplary embodiment.
Figure 3:
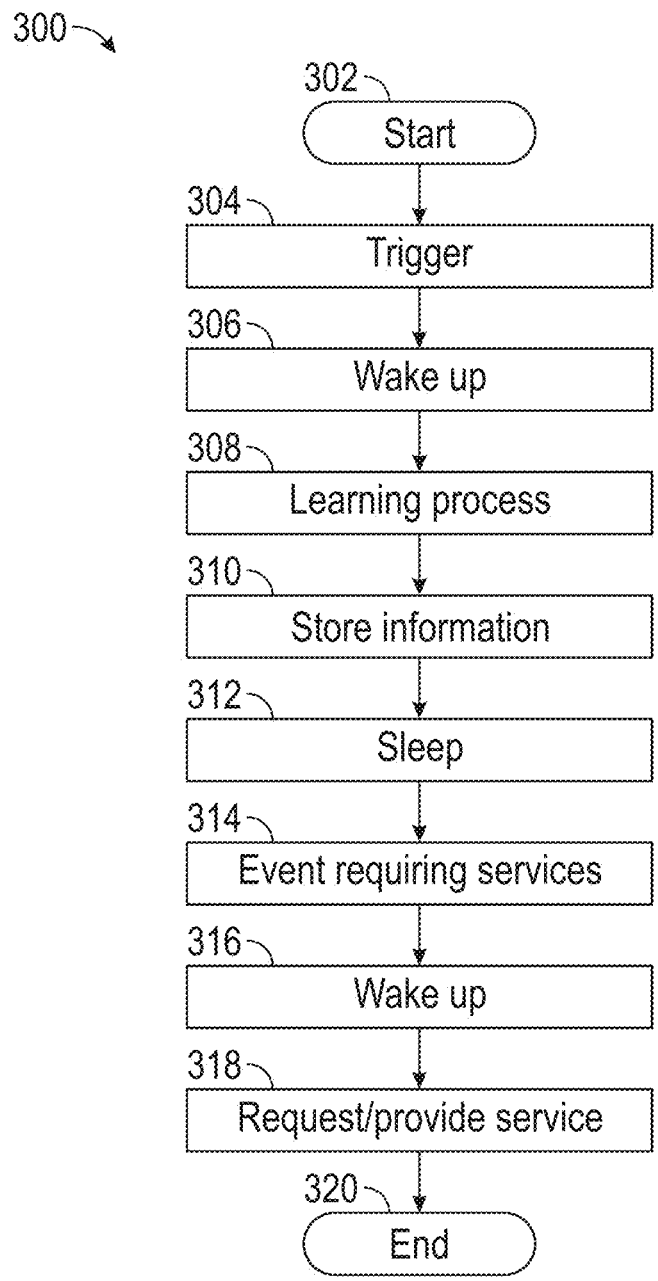
FIG. 3 is a process for controlling service discovery for a plurality of control modules of a vehicle, and that can be implemented in connection with the vehicle of FIG. 1, including the control modules of FIGS. 1 and 2, in accordance with an exemplary embodiment.

FIG. 1 illustrates a vehicle 100. As described in greater detail below, in various embodiments the vehicle 100 includes a control system 102 that includes a transceiver 104, a communications network 106, and a plurality of control modules 108 that request services from and provide services to one another in accordance with a service discovery process 300 as depicted in FIG. 3 and described in greater detail further below in connection therewith.

In various embodiments, the vehicle 100 comprises an automobile. The vehicle 100 may be any one of a number of different types of automobiles, such as, for example, a sedan, a wagon, a truck, or a sport utility vehicle (SUV). In certain embodiments, the vehicle 100 may also comprise a motorcycle or other vehicle, such as aircraft, spacecraft, watercraft, and so on, and/or one or more other types of mobile platforms (e.g., a robot and/or other mobile platform).

In the depicted embodiment, the vehicle 100 includes a body 110 that substantially encloses other components of the vehicle 100. The vehicle 100 also includes a plurality of wheels 112 near respective corners of the body 110 to facilitate movement of the vehicle 100. In one embodiment, the vehicle 100 includes four wheels 112, although this may vary in other embodiments (for example for trucks and certain other vehicles).

Also as depicted in FIG. 1, in various embodiments the vehicle 100 includes a drive system 114 that is used to propel the vehicle 100. In various embodiments, the drive system 114 may include an internal combustion engine and/or an electric motor/generator, coupled with a transmission thereof. By way of example, the vehicle 100 may also incorporate any one of, or combination of, a number of different types of propulsion systems for the drive system 114, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

With reference back to the control system 102, in various embodiments, each control module 108 comprises a control system or module (e.g., an engine control module, or "ECU") that controls one or more features of the vehicle 100. While six control modules 108 are depicted in FIG. 1 for illustrative purposes only, it will be appreciated that in various embodiments the control system 102 may include any number of control modules 108.

In various embodiments, each control module 108 requests one or more services from one or more other control modules 108, and also provides one or more services to one or more other control modules 108. As referred to herein, "services" may include values for one or more engine parameters (e.g., engine speed, engine revolutions per minute, engine temperature, and so on) as well as one or more other vehicle parameters (such as vehicle speed, vehicle acceleration, vehicle heading, vehicle steering angle, ambient air temperature, and so on) and/or other information related to the vehicle 100, its surroundings, and/or operation of the vehicle 100. In various embodiments, each control module 108 comprises a computer system having a processor and memory, for example as depicted in FIG. 2 and described below in connection therewith.

Figure 2:
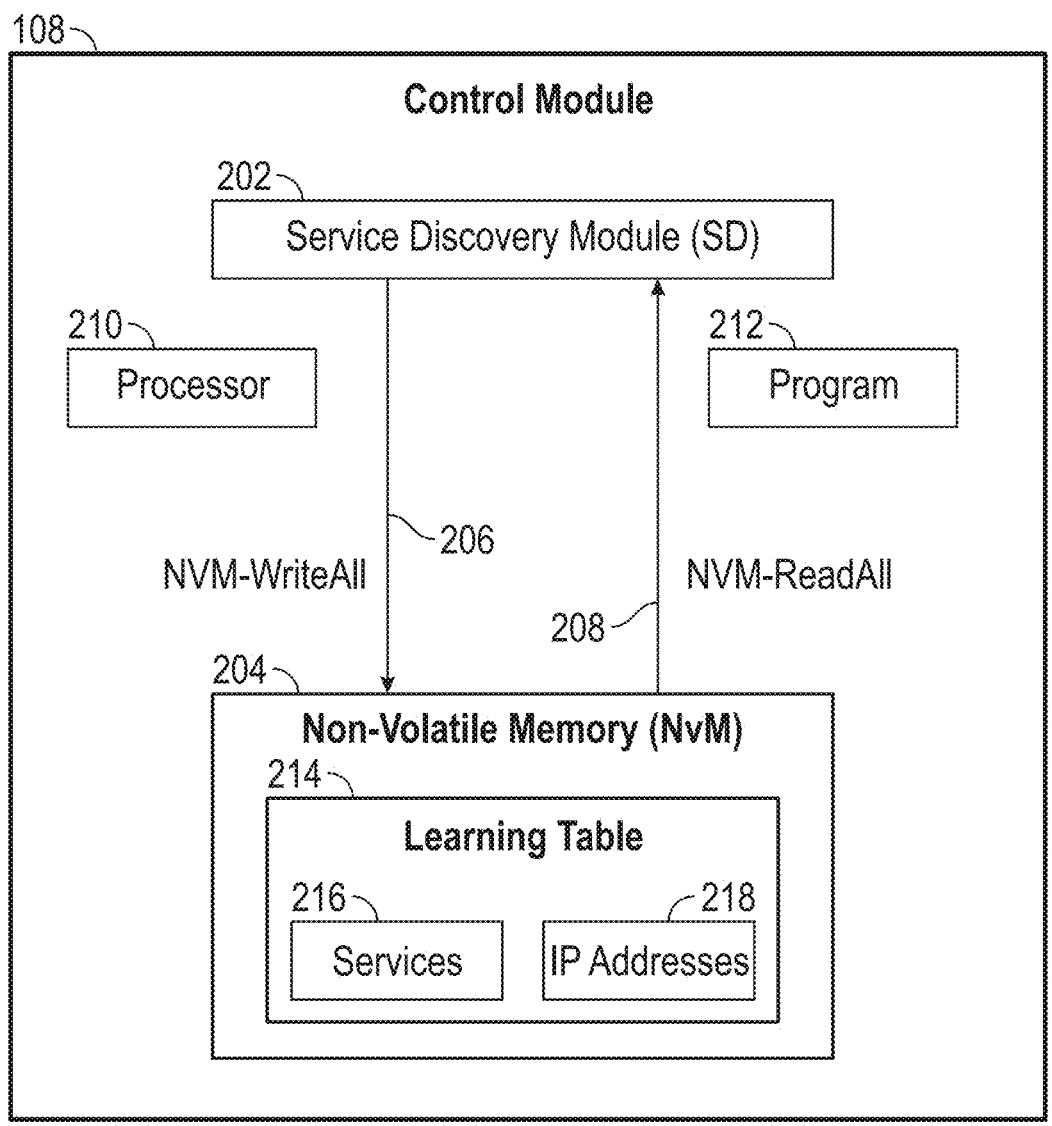
FIG. 2 is a functional block diagram of an exemplary control module of FIG. 1, in accordance with an exemplary embodiment.

As depicted in FIG. 2, in various embodiments each control module 108 comprises a computer system that includes a processor 210 along with a service discovery module (SD) 202 and a non-volatile memory (NvM) 204 that are coupled together. In various embodiments, the processor 210 controls operation of the control module 108 in executing a program 212 (e.g., that resides in the controller flash). Also in various embodiments, the program 212 provides instructions that are executed by the processor 210 in controlling functionality for the control module 108.

In various embodiments, the service discovery module (SD) 202 provides the capabilities to discover services and subscribe to service events. Also in various embodiments, the non-volatile memory 204 includes a learning table 214 that stores information as to services 216 that are offered or requested by the various control modules 108 along with IP addresses 218 of the various control modules 108 that request and provide the services 216.

In addition, in various embodiments, non-volatile memory writing (NvM_WriteAll) 206 is provided of information as to the services into the non-volatile memory 204, and non-volatile memory reading (NvM_ReadAll) 208 is provided of information as to the services from the non-volatile memory 204, as described in greater detail below.

In various embodiments, the non-volatile memory writing (NvM_WriteAll) 206 includes the saving of information by the processor 210 into the non-volatile memory 204 pertaining to the services 216 that are offered or requested by the various control modules 108, along with the associated IP addresses 218 of the control modules 108, prior to when the services are actually needed. Also in various embodiment, the non-volatile memory reading (NvM_ReadAll) 208 includes the subsequent retrieving of the information by the processor 210 from the non-volatile memory 204, when the services are actually needed, of the services 216 that are offered or requested by the control modules 108, along with the associated IP addresses 218 of the control modules 108. In various embodiments, the non-volatile memory writing (NvM_WriteAll) 206 and the non-volatile memory reading (NvM_ReadAll) 208 are performed by the processor 210 as part of the process 300 and implementations thereof that are depicted in FIGS. 3-6 and that are described in greater detail further below in connection therewith.

With reference back to FIG. 1, in various embodiments, the transceiver 104 receives information as to one or more triggers and events that require action by the control modules 108 (such as one or more triggers for service discovery learning and one or more events requiring the services, for example as described in greater detail further below in connection with the process 300 of FIG. 2 and the implementations of FIGS. 3-6). In various embodiments, the transceiver 104 provides the information to one or more processors 210 of one or more respective control modules 108, which perform the steps of the process 300 and implementations thereof that are depicted in FIGS. 3-6 and that are described in greater detail further below in connection therewith.

With continued reference to FIG. 1, in various embodiments the communications network 106 couples each of the control modules 108 to the transceiver 104 and to one another. In various embodiments, the communications network 106 comprises wired communications links connecting the control modules 108 to the transceiver 104 and to one another. In certain embodiments, the communications network 106 comprises one or more Ethernet connections that couple the control modules 108 to the transceiver 104 and to one another. In addition, in certain embodiments, the communications network 106 also couples the control modules 108 to the drive system 114 and/or one or more other vehicle systems and/or components for control thereof by one or more processors 210 of the respective control modules 108.

FIG. 3 is a flowchart of a process 300 for controlling service discovery for a plurality of control modules of a vehicle, in accordance with an exemplary embodiment. In various embodiments, the process 300 can be implemented in connection with the vehicle 100 of FIG. 1, including the control system 102 of FIG. 1 and the control modules 108 of FIGS. 1 and 2, in accordance with an exemplary embodiment. The process 300 is described in greater detail below in connection with FIG. 3 as well as FIGS. 4, 5A, 5B, and 6 (which illustrate exemplary implementations of the process 300 of FIG. 3, in accordance with exemplary embodiments).

With continued reference to FIG. 3, in various embodiments the process 300 begins at step 302. In various embodiments, the process 300 begins when the control modules 108 of FIGS. 1 and 2 are in a dormant mode (e.g., an "off" mode or "sleeping" mode), for example in which the vehicle 100 is not in operation (or is in limited operation) in accordance with an exemplary embodiment.

In various embodiments, a trigger is received (step 304). In various embodiments, the trigger is received as a message received by the transceiver 104 of FIG. 1. In certain embodiments, the trigger includes a software update, such as an over the air ("OTA") software update from a remote server for the control modules 108 of FIGS. 1 and 2 (e.g., as provided via a vehicle manufacturer and/or service center, or the like).

In various embodiments, the control modules are woken up (step 306). Specifically, in various embodiments, the control modules 108 of FIGS. 1 and 2 are woken up into an active state for a relatively short amount of time (e.g., less than a minute, in various embodiments, and for approximately five seconds in certain embodiments) in order to perform a learning process in response to the trigger (e.g., the software update). In various embodiments, the control modules 108 are woken up via one of the processors 210 after receiving the message of the trigger from the transceiver 104.

In various embodiments, the learning process is performed (step 308). Specifically, in various embodiments, a learning process (or service discovery learning) is performed by the control modules 108 (via instructions provided by the processors 210 thereof) after the indication of the trigger of step 304 (and before the services are actually required) as to a new and/or updated list of services that are to be offered and requested by various control modules 108, along with an identification of the control modules 108 (including respective IP addresses) that are offering and requesting the various services. With reference to FIG. 2, in various embodiments the learning process of step 308 is performed with respect to the services 216 and IP addresses 218 of the learning table 214 depicted in FIG. 2 for each of the control modules 108 of FIG. 1, as a result of the trigger of step 304 (e.g., software update) that requires new or updated learning.

Figure 4:
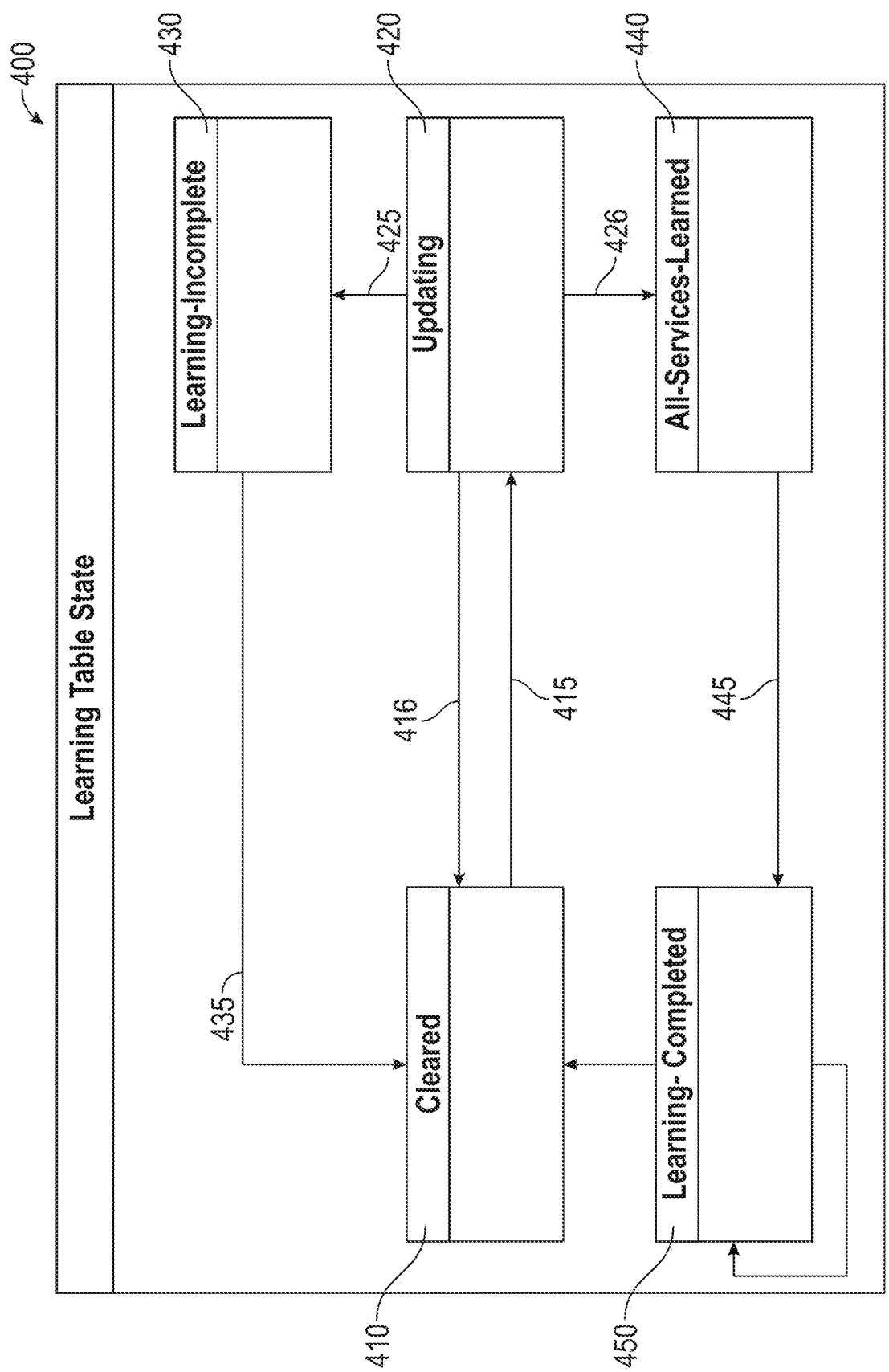

With reference now to FIG. 4, a learning table state diagram 400 is provided as to the learning table states associated with the learning table 214 of FIG. 2 for each of the modules 108 of FIG. 1 during the learning process of step 308 of FIG. 3, in accordance with an exemplary embodiment.

As illustrated in the learning state diagram 400 of FIG. 4, in various embodiments the information in the learning table is cleared, thereby resulting in a cleared learning table state 410. Specifically, in various embodiments, the information in the learning tables 214 for each of the control modules 108 (e.g., from a previous learning-completed state 450 of a prior iteration) is cleared as a result of the trigger (e.g., software update). Also in various embodiments, a learning timer is initiated when the learning table is at the cleared state 410. In various embodiments, these actions are performed by one or more processors. In certain embodiments, these actions are performed for each respective control module 108 by the processor 210 of the respective control module 108.

In various embodiments, as the learning process proceeds, information as to services and/or subscriptions (including various control modules 108 that offer or subscribe to the services) are added to the learning table at 415, thereby resulting in an updating state 420 of the learning table. Specifically, in various embodiments, information is gathered by each control module 108 as to services that are offered or requested by other service module 108, via respective processors 210 of the various service modules 108. Also in various embodiments, if an error occurs during the updating state 420 (e.g., if a memory block is corrupted and needs to be re-set to an initial value), then a clearing of the information occurs again at 416, thereby returning the learning table to the cleared state 410.

Also in various embodiments, if the learning process timer has expired during the updating state 420 and the updating of the learning table is not complete, then a "learning incomplete" determination is made at 425, thereby resulting in the learning-incomplete state 430 of FIG. 4. In certain embodiments, this is performed for each respective control module 108 by the processor 210 of the respective control module 108.

In various embodiments, when the learning table is in the learning-incomplete state 430, the information in the learning table is again cleared at 435, thereby returning to the cleared state 410. In various embodiments, this is performed separately for each control module 108 via the respective processors 210 thereof (e.g., in certain embodiments, for particular control modules 108 that are in the learning-incomplete state 430). In various embodiments, the learning process then continues again with a new iteration of 415.

Conversely, and with reference back to the updating state 420, in various embodiments if the learning table is complete, then a "learning complete" determination is made at 426, thereby resulting in the all-services-learned state 440 of FIG. 4. In various embodiments, the all-services-learned state 440 is reached for a particular module 108 when the learning table 214 of the particular control module 108 includes, for each particular control module, both: (i) a list of all of the services required by the particular control module 108 along with the IP addresses of the other control modules 108 offering the services required by the particular control module 108; and (ii) a list of all of the services offered by the particular control module 108 along with the IP addresses of the other control modules 108 that are requesting and/or subscribing to these services offered by the particular control module 108. In certain embodiments, this is performed for each respective control module 108 by the processor 210 of the respective control module 108.

In various embodiments, once the control modules 108 are in the all-services-learned state 440, then once the learning process timer has expired at 445, the control modules 108 reach the learning-completed state 450. In various embodiments, as part of the learning-completed state 450, detected updates to the locations (e.g., IP addresses) of the service providers or subscribers (e.g., certain other control modules 108 offering or requesting services) are stored into the learning table 214 of the non-volatile memory 204 of FIG. 2, and other entities (e.g., certain other control modules 108 which may no longer be offering or requesting the services) are removed from the learning table 214 of the non-volatile memory 204.

Specifically, and with reference back to FIG. 3, in various embodiments the information form the learning process is stored (step 310). As alluded to above, in various embodiments, the information from the learning process, including the list of services 216 and the IP addresses 218 of the providers and subscribers thereof, are stored in the updated learning table 214 of the non-volatile memory 204 of FIG. 2. In various embodiments, this is performed for each of the control modules 108 via the respective processors 210 thereof, including the non-volatile memory writing 206 by the processor 210 into the non-volatile memory 204 as depicted in FIG. 2.

With reference to FIGS. 5A and 5B, illustrations are provided of a first learning table 500 (in FIG. 5A) and a second learning table 550 (in FIG. 5B), respectively. In various embodiments, both the first learning table 500 and the second learning table 550 correspond to the learning table 214 of FIG. 2 (or a portion thereof).

With reference first to FIG. 5A, the first learning table 500 corresponds to a learning table 214 (or portion thereof) of FIG. 2 of a particular control module 108 that is a client (or subscriber) of one or more services that are provided to the particular control module 108 by one or more other control modules 108. As depicted in FIG. 5A, the first learning table 500 includes one or more service identifiers 504 and server IP addresses 506. In various embodiments, the service identifiers 504 pertain to one or more services (such as a first service 508 and a second service 510, by way of example) that are required by the particular control module 108, whereas the IP addresses 506 pertain to one or more other control modules 108 (e.g., with a first IP address 512 and/or a second IP address 514, and so on) that provide the services for the particular control module 108.

With reference first to FIG. 5B, the second learning table 550) corresponds to a learning table 214 (or portion thereof) of FIG. 2 of a particular control module 108 that is a server (or provider) of one or more services that are provided by the particular control module 108 to one or more other control modules 108 that request and/or subscribe to the services. As depicted in FIG. 5B, the second learning table 550 include one or more service identifiers 554 and server IP addresses 556. In various embodiments, the service identifiers 554 pertain to one or more services (such as a first service 558 and a second service 560, by way of example) that are offered or provided by the particular control module 108, whereas the IP addresses 556 pertain to one or more other control modules 108 (e.g., with a first IP address 562 and/or a second IP address 564, and so on) that subscribe to or receive the services provided by the particular control module 108.

While FIGS. 5A and 5B depict separate learning tables 500 and 550 for control modules 108 that are clients versus servers, respectively, it will be appreciated that at least certain control modules 108 may be both clients and servers. Specifically, for various control modules 108 that receive some services (as a client or subscriber) but that provide some other services (as a server or provider), it will be appreciated that such control modules 108 may have learning tables 214 of FIG. 2 that include both a client section or component (e.g., corresponding to the first learning table 500 of FIG. 5A) as well as server section or component (e.g., corresponding to the second learning table 550 of FIG. 5B).

With reference back to FIG. 3, in various embodiments, an event is detected that requires services (step 314). In various embodiments, such an event may comprise, for example, a turning on of the engine or motor of the vehicle, and/or executing a vehicle turn and/or any number of other vehicle actions that may require services such as one or more engine parameters, one or more other vehicle parameters, or the like.

Also in various embodiments, one or more control modules are woken up (step 316). In various embodiments, in one example when a particular service is required, a particular control module 108 requiring the particular service wakes up certain other control module(s) 108 that are known to offer or provide the particular service according to the learning table 214 of the particular control module 108 (but does not wake up other control modules 108 that are unrelated to the service). Also in various embodiments, in another example, a particular control module 108 offering the particular service wakes up certain other control modules 108 that are known to require or subscribe to the particular service according to the learning table 214 of the particular control module 108 (but does not wake up other control modules 108 that are unrelated to the service). Accordingly, in various embodiments, in either situation, the processor 210 of the particular control module 108 need only wake up certain selected other control module(s) 108 that offer or subscribe to the particular service, rather than waking up all of the control modules 108, as a result of the information that was previously stored in the learning table 214. Also in various embodiments, the selection of which other control module(s) to wake up is made based on the information in the learning table 214 via the non-volatile memory reading 208 by the processor 210 from the non-volatile memory 204 as depicted in FIG. 2

In various embodiments, the services are requested and provided (step 318). In various embodiments, various control modules 108 (namely, the particular control module 108 of step 316 and the other control modules 108 that were woken in step 316) provide and receive the requested services to and from one another. Specifically, in various embodiments, the subscriber control modules 108 receive the requested services from the provider control modules 108 for each particular service, and so on. Also in various embodiments, the services are implemented via respective control modules 108 in executing one or more vehicle actions. Specifically, in various embodiments, one or more processors 210 of one or more respective control modules 108 utilize the services (e.g., the engine parameters, the vehicle parameters, and/or the one or more services) in operating the vehicle, including controlling acceleration, deceleration, steering of the vehicle through vehicle movement, turns, braking, and/or various other vehicle maneuvers and/or actions.

In various embodiments, the process then terminates at step 320.

Figure 6:
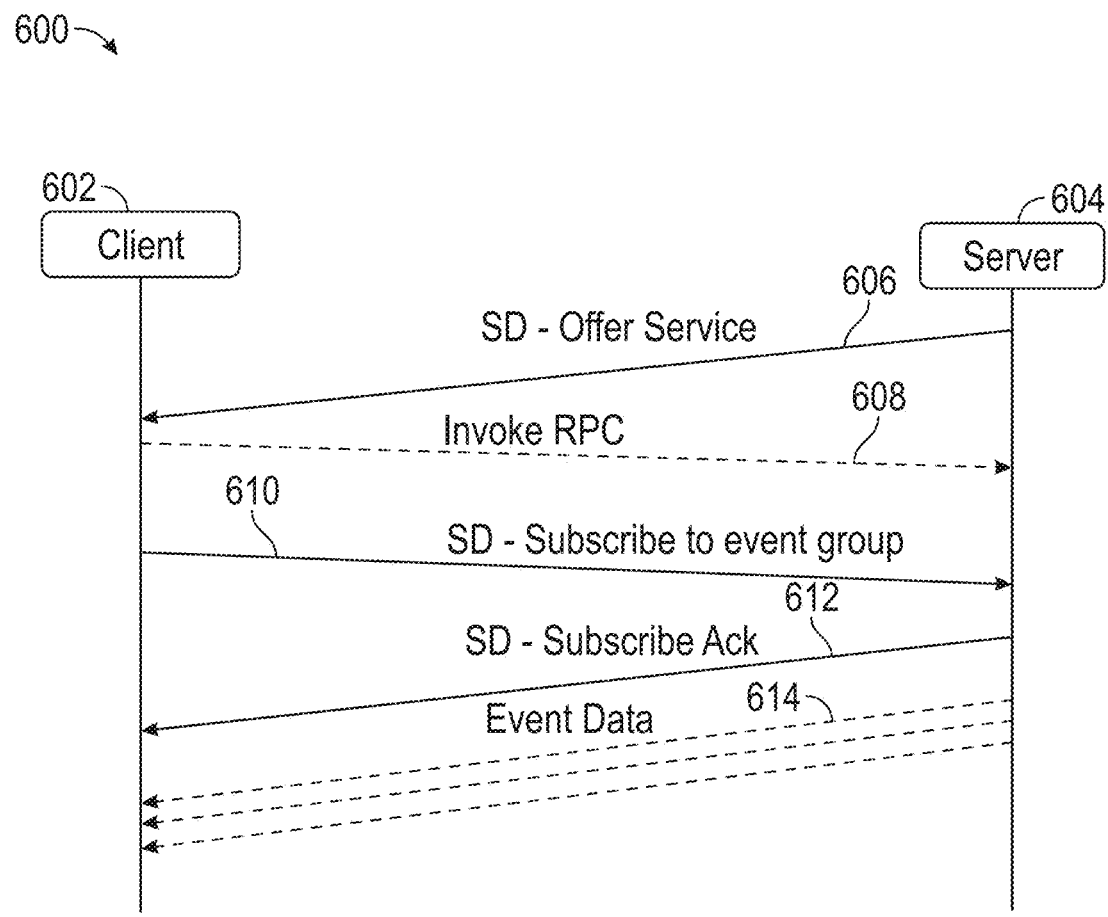

With reference to FIG. 6, a flow diagram 600 is provided with respect to the process 300 of FIG. 3, including the learning process of step 308 and the learning table state diagram 400 of FIG. 4, in accordance with an exemplary embodiment. As depicted in FIG. 6, in various embodiments, a client 602 (e.g., a control module 108 subscribing to one or more services) communicates with a server 604 (e.g., another control module 108 that is providing the one or more services).

In various embodiments, as depicted in FIG. 6, the server 604 offers one or more of its services for the client at 606. Also in various embodiments, in response, the client 602 invokes a remote procedure call at 608 to the server 604. Also in various embodiment, the client 602 subscribes to the service at 610 (e.g., as a subscriber to an event group associated with the server 604). Also in various embodiments, the server 604 acknowledges the subscription of the client 602 at 612. In various embodiments, 606-612 occur during the learning process of step 308 of the process 300 of FIG. 3, after the client 602 and the server 604 are woken up at step 306 following the trigger of step 304 of FIG. 3 but before an event has occurred for which the services are actually required.

Subsequently, in various embodiments the services are provided by the server 604 to the client 602 at 614 after an event has occurred for which the services are actually needed. In various embodiments, the providing of the services (e.g., in the form of event data) corresponds to steps 314-318 of the process 300 of FIG. 3, for example as an event occurs (step 314), the control modules 108 pertaining to the services are woken up (step 316), and the services are requested and provided (step 318 of FIG. 3).

In various embodiments, methods and systems are provided for service discovery learning for control units of vehicles. In various embodiments, once a software update or other trigger occurs, the control modules 108 are each woken up for a relatively short duration of time (e.g., approximately five seconds, in certain embodiments) in which the service discover learning is performed for each of the control units 108. In various embodiments, during the service discovery learning, learning tables are generated and/or updated, and are stored in non-volatile memory of the control units 108 as to services that are needed or offered, along with an identification of IP addresses for other control modules 108 that subscribe to or offer such services. In various embodiments, this service discovery learning is performed before the services are actually needed. Accordingly, as the various control modules 108 go to sleep after the service discovery learning (as shown in step 312 as depicted in FIG. 3), and the actual need for services subsequently arises, the services may be offered and received more efficiently as the requesting control module 108 knows ahead of time which control modules 108 offer the services (and knows the IP addresses for such control modules 108 in advance), and only those control modules 108 pertaining to the services need be woken up, and so on.

It will be appreciated that the vehicle, systems, components, methods, and implementations may vary from those depicted in the Figures and described herein. For example, the vehicle 100 of FIG. 1, including the control system 102, the control modules 108, and components thereof, may differ from the depictions in FIGS. 1 and 2. It will similarly be appreciated that the steps of the processes and implementations of FIGS. 3-6 may differ from those depicted in the Figures, and/or that various steps may occur concurrently and/or in a different order than that depicted in the Figures.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising:
receiving an indication of a trigger for service discovery learning for a plurality of control modules for a vehicle, the trigger comprising a message received via a transceiver of the vehicle as to an over the air ("OTA") software update for the vehicle pertaining to control of an engine of the vehicle, including as to one or more engine control parameters for the engine of the vehicle;
upon receiving the message, clearing a learning table for one or more selected control modules for which the message was intended, and selectively waking up only the selected control modules for which the message was intended from a dormant mode for a predetermined amount of time that is determined via a timer that is initiated when the learning table is cleared, and performing the service discovery learning among the selected control modules via a communications network as to services to be offered or required by each of the control modules, including as to one or more engine control parameters for the engine of the vehicle, after the indication of the trigger via the receiving of the message and before the services are actually required, and updating the learning table for the selected control modules based on the learning, in accordance with instructions provided by one or more processors of the plurality of control modules; and
subsequently, when an event occurs in which the services are actually required, requesting and offering the services via the plurality of control modules based on the service discovery learning, and controlling the vehicle actions via the one or more engine control parameters via the services in response to the event.

2. The method of claim 1, wherein the controlling of the vehicle actions comprises:
controlling the one or more vehicle actions, in accordance with control instructions provided by the one or more processors, using the one or more engine control parameters or other vehicle parameters via the services in response to the event, including by controlling a speed, revolutions per minute, or temperature of the engine via the services in accordance with the previously performed service discovery learning.

3. The method of claim 2, wherein the controlling of the vehicle actions comprises:
controlling the one or more vehicle actions, in accordance with control instructions provided by the one or more processors, using the one or more engine control parameters or other vehicle parameters via the services in response to the event, including by controlling each of the following: the speed, the revolutions per minute, and the temperature of the engine via the services in accordance with the previously performed service discovery learning.

4. The method of claim 1, wherein the plurality of control modules are in a dormant mode after the service discovery learning and prior to the event in which the services are actually required, and only the selected control modules of the plurality of control modules that are needed for the services are woken from the dormant mode following the event.

5. The method of claim 1, wherein:
the service discovery learning includes, for each particular control module, identifying a list of services to be offered or required by the particular control module along with IP addresses of other control modules that subscribe to or provide the services, and the method further comprises:
storing, into a non-volatile memory of the particular control module, a learning table that includes the list of services to be offered or required by the particular control module along with the IP addresses of the other control modules that subscribe to or provide the services; and
subsequently, when the event occurs in which the services are actually required, requesting and offering the services via the plurality of control modules based on the learning table stored in the non-volatile memory of the particular control module.

6. The method of claim 1, wherein:
the service discovery learning is restarted when the service discovery learning is not yet completed upon expiration of the timer.

7. The method of claim 1, wherein the predetermined amount of time for which the selected control modules are selectively woken up for the service discovery learning is equal to approximately five seconds.

8. The method of claim 1, wherein the event comprise the engine being turned on.

9. The method of claim 1, wherein the event comprises the execution of a vehicle turn.

10. The method of claim 1, wherein the OTA software update is provided as part of an OTA subscription service for the vehicle.

11. The method of claim 10, wherein at least one of the plurality of control modules:
serves as both a subscriber of one or more first services; and a provider of one or more second service; and
includes a first learning table for the first services for which it is a subscriber in addition to a second learning table for the second services for which it is a provider.

12. The method of claim 1, wherein the learning table comprises:
a first learning table of a first particular control module that is a client that subscribes to one or more services that are provided to the first particular control module by one or more other control modules, the first learning table including one or more first service identifiers and server IP addresses for the first particular control module that subscribes to the one or more services; and
a second learning table of a second particular control module of the one or more other controls modules that is a server that provides the one or more services, the second learning table including second server identifiers and server IP addresses for the second particular control module that provides the one or more services.

13. A system comprising:
a transceiver configured to at least facilitate receiving an indication of a trigger for service discovery learning for a plurality of control modules for a vehicle, the trigger comprising a message received via a transceiver of the vehicle as to an over the air ("OTA") software update for the vehicle pertaining to control of an engine of the vehicle, including as to one or more engine control parameters for the engine of the vehicle; and
one or more processors that are coupled to the transceiver and that are configured to at least facilitate:
upon receiving the message, clearing a learning table for one or more selected control modules for which the message was intended, and selectively waking up only the selected control modules for which the message was intended from a dormant mode for a predetermined amount of time that is determined via a timer that is initiated when the learning table is cleared, and performing the service discovery learning among the plurality of control modules as to services to be offered or required by each of the control modules, after the indication of the trigger and before the services are actually required; and subsequently, when an event occurs in which the services are actually required, requesting and offering the services via the plurality of control modules based on the service discovery learning, and controlling the vehicle actions via the one or more engine control parameters via the services in response to the event.

14. The system of claim 13, wherein the one or more processors are further configured to at least facilitate controlling the one or more vehicle actions, in accordance with control instructions provided by the one or more processors, using the one or more engine control parameters or other vehicle parameters via the services in response to the event, including by controlling a speed, revolutions per minute, or temperature of the engine via the services in accordance with the previously performed service discovery learning.

15. The system of claim 13, wherein the plurality of control modules are in a dormant mode after the service discovery learning and prior to the event in which the services are actually required, and only the selected control modules of the plurality of control modules that are needed for the services are woken from the dormant mode following the event.

16. The system of claim 13, wherein:
the service discovery learning includes, for each particular control module, identifying a list of services to be offered or required by the particular control module along with IP addresses of other control modules that subscribe to or provide the services; and
the one or more processors are further configured to at least facilitate:
storing, into a non-volatile memory of the particular control module, a learning table that includes the list of services to be offered or required by the particular control module along with the IP addresses of the other control modules that subscribe to or provide the services; and
subsequently, when the event occurs in which the services are actually required, requesting and offering the services via the plurality of control modules based on information retrieved by a processor of the particular control module from the learning table stored in the non-volatile memory of the particular control module.

17. The system of claim 13, wherein:
the service discovery learning is restarted when the service discovery learning is not yet completed upon expiration of the timer.

18. A vehicle comprising:
a body;
a drive system configured to move the body;
a transceiver configured to at least facilitate receiving an indication of a trigger for service discovery learning for a plurality of control modules for the vehicle, the trigger comprising a message received via a transceiver of the vehicle as to an over the air ("OTA") software update for the vehicle pertaining to control of an engine of the vehicle, including as to one or more engine control parameters for the engine of the vehicle; and
one or more processors that are disposed on or within the body, that are coupled to the transceiver, and that are configured to at least facilitate:
upon receiving the message, clearing a learning table for one or more selected control modules for which the message was intended, and selectively waking up only the selected control modules for which the message was intended from a dormant mode for a predetermined amount of time that is determined via a timer that is initiated when the learning table is cleared, and performing the service discovery learning among the plurality of control modules as to services to be offered or required by each of the control modules, after the indication of the trigger and before the services are actually required; and
subsequently, when an event occurs in which the services are actually required, requesting and offering the services via the plurality of control modules based on the service discovery learning, and controlling the vehicle actions via the one or more engine control parameters via the services in response to the event.

19. The vehicle of claim 18, wherein the plurality of control modules are in a dormant mode after the service discovery learning and prior to the event in which the services are actually required, and only the selected control modules of the plurality of control modules that are needed for the services are woken from the dormant mode following the event.

20. The vehicle of claim 18, further comprising:
a non-volatile memory configured to store a learning table that includes a list of services to be offered or required by a particular control module along with IP addresses of other control modules that subscribe to or provide the services;
wherein the one or more processors are further configured to at least facilitate storing the learning table into the non-volatile memory; and
wherein the one or more processors are further configured to at least facilitate:
subsequently, when the event occurs in which the services are actually required, requesting and offering the services via the plurality of control modules based on information retrieved by a processor of the particular control module from the learning table stored in the non-volatile memory of the particular control module.

* * * * *